United States Patent
Garnett et al.

(10) Patent No.: US 8,262,154 B2
(45) Date of Patent: Sep. 11, 2012

(54) VEHICLE SIDE DOOR STRUCTURES

(75) Inventors: Charles Christopher Garnett, Farmington Hills, MI (US); Mingher F. Shen, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 248 days.

(21) Appl. No.: 12/627,155

(22) Filed: Nov. 30, 2009

(65) Prior Publication Data

US 2011/0127797 A1    Jun. 2, 2011

(51) Int. Cl.
*B60R 13/02* (2006.01)
(52) U.S. Cl. .................... 296/199; 296/209; 296/1.08
(58) Field of Classification Search .................. 296/199, 296/209, 29, 1.08
See application file for complete search history.

(56) References Cited

U.S. PATENT DOCUMENTS

| | | | |
|---|---|---|---|
| 3,580,628 A | 5/1971 | Rantala | |
| 5,879,045 A | 3/1999 | Logan | |
| 6,102,473 A | 8/2000 | Steininger et al. | |
| 6,139,089 A | 10/2000 | Troyer | |
| 7,040,682 B2 * | 5/2006 | Tokumoto et al. | 296/1.08 |
| 7,144,075 B2 * | 12/2006 | Shishikura | 296/209 |
| 7,168,757 B2 * | 1/2007 | Futatsuhashi | 296/209 |
| 7,354,102 B2 | 4/2008 | Cave et al. | |
| 7,464,986 B2 | 12/2008 | Maki | |
| 2006/0154023 A1 | 7/2006 | Maki | |
| 2006/0267381 A1 | 11/2006 | Cave et al. | |
| 2007/0085361 A1 | 4/2007 | Hauser | |
| 2007/0278809 A1 * | 12/2007 | Reed et al. | 296/1.08 |
| 2009/0167010 A1 * | 7/2009 | Rompage et al. | 280/847 |
| 2011/0025085 A1 * | 2/2011 | Kubo | 296/1.08 |

* cited by examiner

*Primary Examiner* — Jason S Morrow
(74) *Attorney, Agent, or Firm* — Dinsmore & Shohl LLP

(57) ABSTRACT

A vehicle side door structure includes a door and a rocker panel providing a show surface beneath the door. The rocker panel includes a trim portion providing the show surface and a connecting portion moveably connected to the trim portion by a region of weakness such that the connecting portion is movable relative to the trim portion while connected thereto between an unlatched position and a latched position. The trim portion includes a lowest point and an upwardly extending section that locates a lowermost point of the region of weakness above the lowest point of the trim portion with the connecting portion in the latched position.

20 Claims, 6 Drawing Sheets

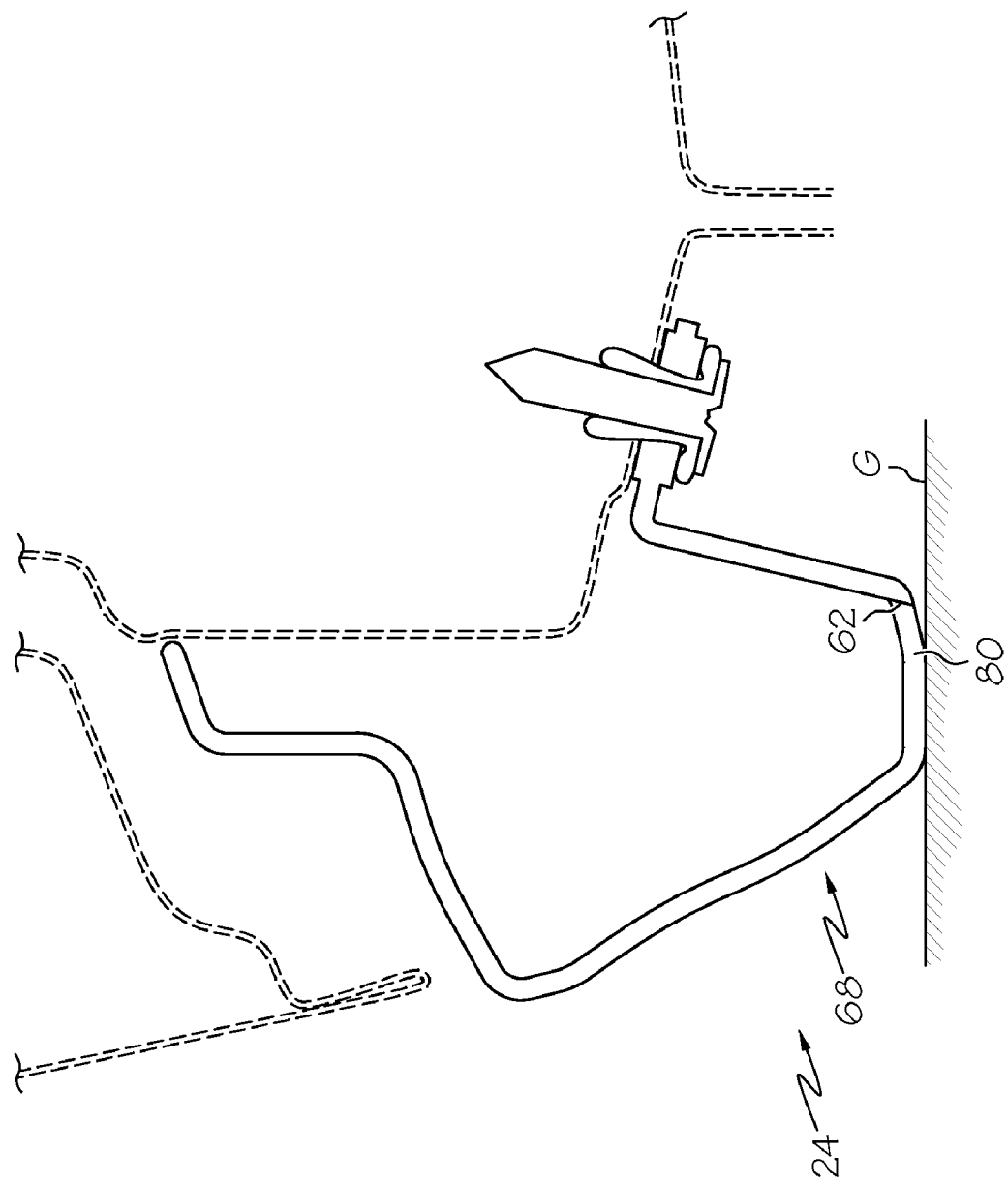

VEHICLE SIDE DOOR STRUCTURES

TECHNICAL FIELD

The present specification generally relates to vehicle side door structures.

BACKGROUND

A variety of trim panels are used to form exterior surfaces on vehicles. Such trim panels have been formed of sheet metal, but are increasingly being formed using molded polymeric materials. One such trim panel is a rocker panel, sometimes referred to as a side sill, and is often used to form a show surface underneath side doors of vehicles. Various techniques have been used for attaching such rocker panels to the bodies of the vehicles. For example, rivets or threaded fasteners may be used for attaching the rocker panels to vehicle bodies.

Some rocker panels may be particularly close to the road. Given the proximity of the rocker panels to the road, it is not uncommon for portions of the rocker panels to come into contact with the road surface or curb. Thus, it may be desirable to provide rocker panels with structural features providing increased strength and resistance to damage.

SUMMARY

In one embodiment, a vehicle side door structure includes a door and a rocker panel providing a show surface beneath the door. The rocker panel includes a trim portion providing the show surface and a connecting portion moveably connected to the trim portion by a region of weakness such that the connecting portion is movable relative to the trim portion while connected thereto between an unlatched position and a latched position. The trim portion includes a lowest point and an upwardly extending section that locates a lowermost point of the region of weakness above the lowest point of the trim portion with the connecting portion in the latched position.

In another embodiment, a rocker panel provides a show surface beneath a vehicle door. The rocker panel includes a trim portion providing the show surface and a connecting portion moveably connected to the trim portion by a region of weakness such that the connecting portion is movable relative to the trim portion while connected thereto between an unlatched position and a latched position. The trim portion includes a lowest point and an upwardly extending section that locates a lowermost point of the region of weakness about 0.5 mm or more above the lowest point of the trim portion with the connecting portion in the latched position.

In another embodiment, a vehicle includes a side door structure including a door and a frame member including an inwardly extending portion and a vertically extending portion. A rocker panel is connected to the frame member for providing a show surface beneath the door. The rocker panel includes a trim portion connected to the vertically extending portion of the frame member and a connecting portion connected to the inwardly extending portion of the frame member. The connecting portion is moveably connected to the trim portion by a region of weakness such that the connecting portion is movable relative to the trim portion while connected thereto between an unlatched position and a latched position. The trim portion includes a lowest point and a bend between the lowest point and the connecting portion providing an upwardly extending section that locates a lowermost point of the region of weakness above the lowest point of the trim portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5 illustrates the rocker panel of FIG. 3 in operation according to one or more embodiments described herein.

DETAILED DESCRIPTION

Embodiments described herein generally relate to vehicle side door structures, such as rocker panels, that include one or more features for providing increased strength and resistance to damage, for example, due to contact with the road or other structures, such as curbs. As will be described in greater detail below, the rocker panels may include one or more features locating regions of weakness remote from the ground and above lowermost regions of the rocker panels. Locating such regions of weakness remote from the ground and above lowermost regions of the rocker panels can reduce the likelihood that the areas of weakness will come into contact with the road or other road structures.

Figure 1:
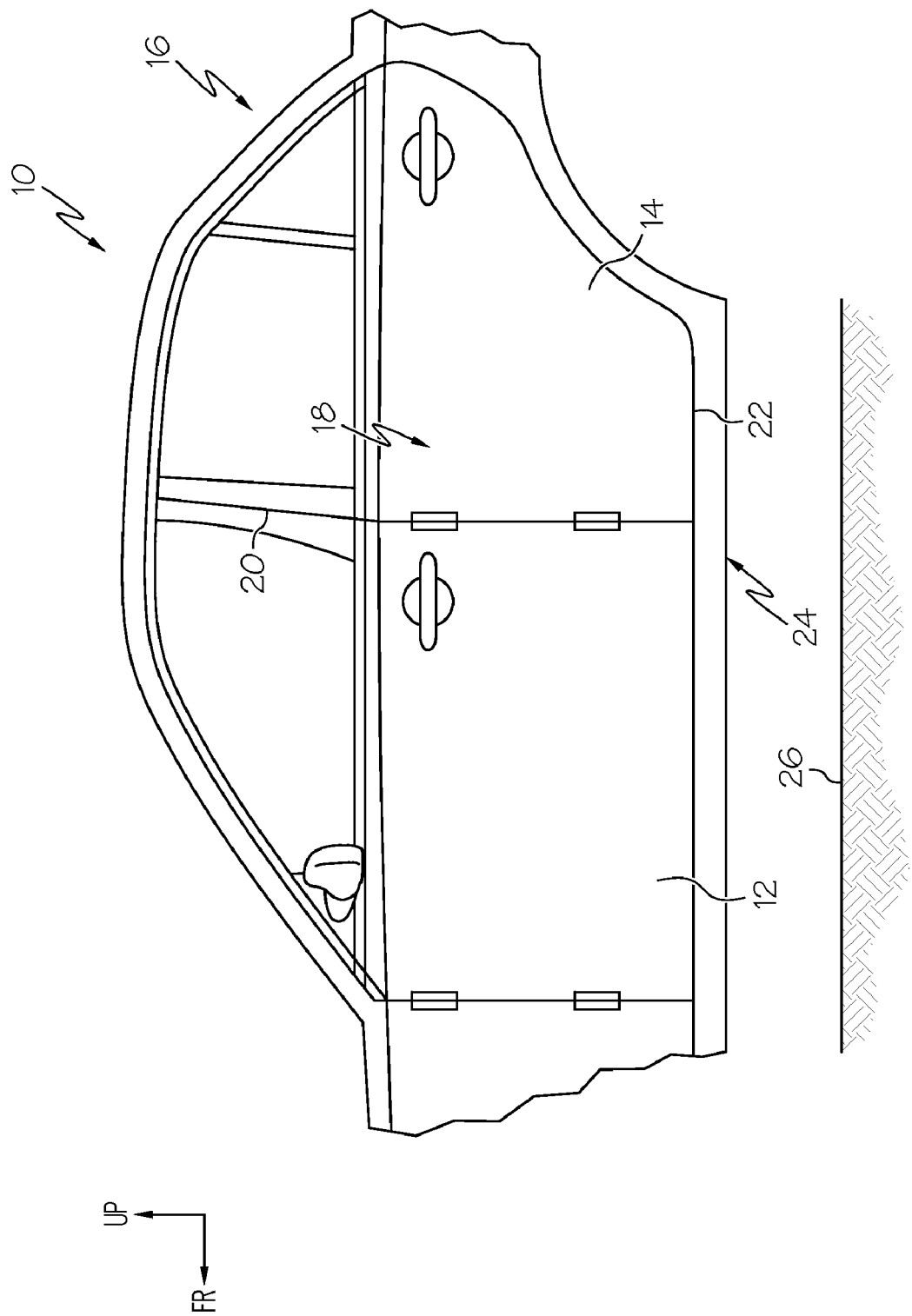
FIG. 1 is a side view of a vehicle including side door structure according to one or more embodiments shown and described herein.

Referring to FIG. 1, an embodiment of a vehicle 10 may generally include two or more doors, such as a front driver's door 12 and a rear passenger's door 14. While the doors 12 and 14 are both shown as being hinged, one or more of the doors may be a sliding type door, such as commonly found on a minivan. A vehicle body 16, which is mounted on a chassis of the vehicle 10, may include an outer skin 18 (e.g., formed of sheet metal and/or plastic) which is supported by a vehicle frame 20 that is attached to the chassis. A lower edge 22 of the vehicle may be trimmed by a rocker panel 24 that extends below the doors 12 and/or 14, which can add an aesthetically pleasing appearance to the lower edge 22 of the vehicle body 16.

As can be seen, the rocker panel 24 is in close proximity to the ground 26 compared to other trim panels of the vehicle 10. Because the rocker panel 24 may come into contact with the ground 26, the rocker panel 24 is provided with one or more strengthening features, which may protect the rocker panel 24 from excessive damage due to contact with the ground or other objects.

Figure 2:
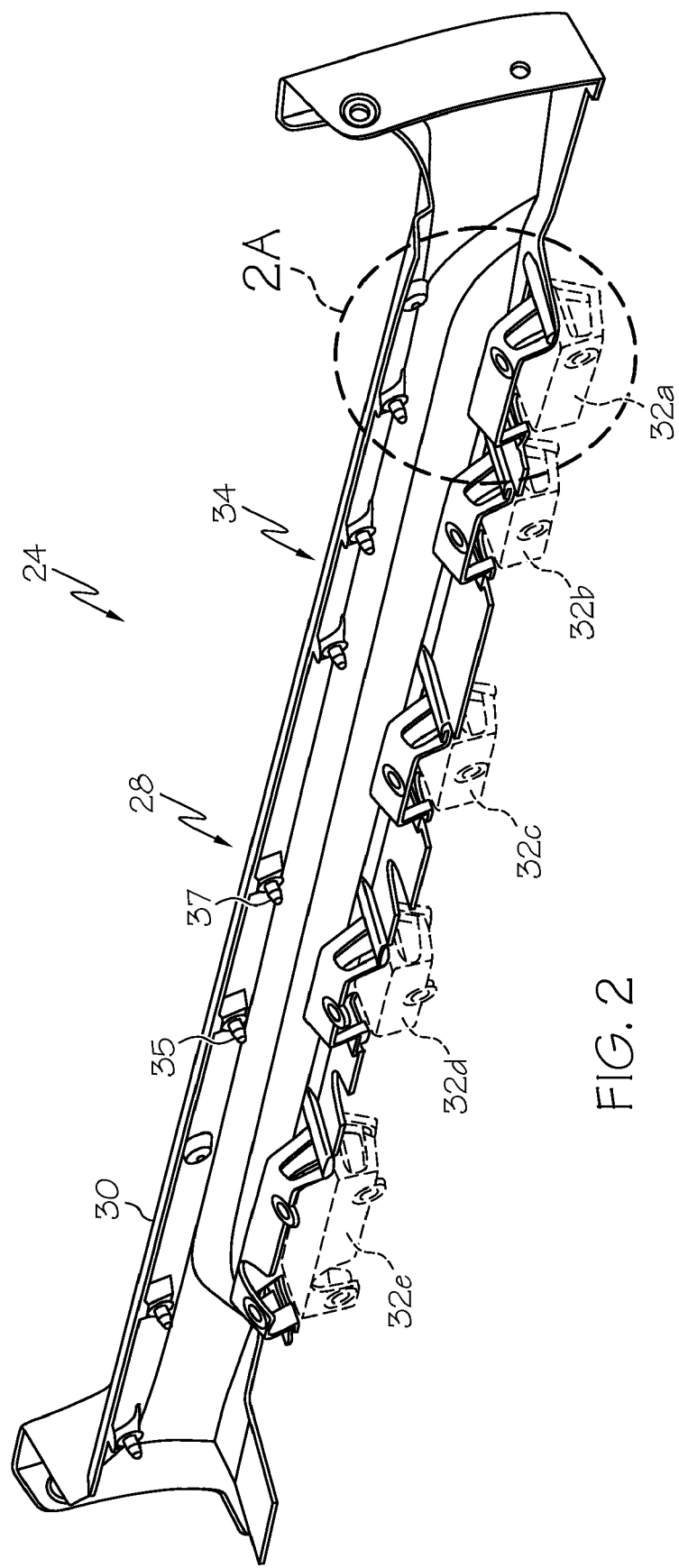
FIG. 2 is a perspective view of a rocker panel for use with the vehicle of FIG. 1 according to one or more embodiments described herein.

Referring to FIG. 2, an isometric view of the rocker panel 24 is shown in an unattached state, isolated from the vehicle body 16. While only one rocker panel 24 is illustrated in FIGS. 1 and 2, there may be two identical or similar rocker panels, one for each side of the vehicle 10. The rocker panel 24 includes a trim portion 28 with an upper connecting portion 30 and one or more lower connecting portions 32a-32e. The trim portion 28 includes an outer surface 34 that provides a show surface extending downwardly from the vehicle 10 toward the ground. In some embodiments, the outer surface 34 may be textured and have a color matching the appearance of the vehicle 10, for example, using a spray coating or other material. A row of fastener openings 35 may be provided in the upper connecting portion 30 for receiving fasteners 37 or other connectors for use in fastening the rocker panel 24 to the vehicle body 16.

Each lower connecting portion 32a-32e is movably attached to the trim portion 28. As will be described below, in some embodiments, one or more (such as all) of the lower connecting portions 32a-32e may be moveably connected to the trim portion 28 by a region of weakness, such as a living hinge, such that the lower connecting portions 32a-32e can be moved at the region of weakness from an unlatched (e.g., lowered) position as indicated by the dotted lines to a latched (e.g., raised) position as indicated by the solid lines relative to the trim portion 28. Such a moveable arrangement facilitates forming of the rocker panel 24 as an integral piece (e.g., by molding) and facilitates attaching the rocker panel 24 to the vehicle body 16.

Figure 2A:
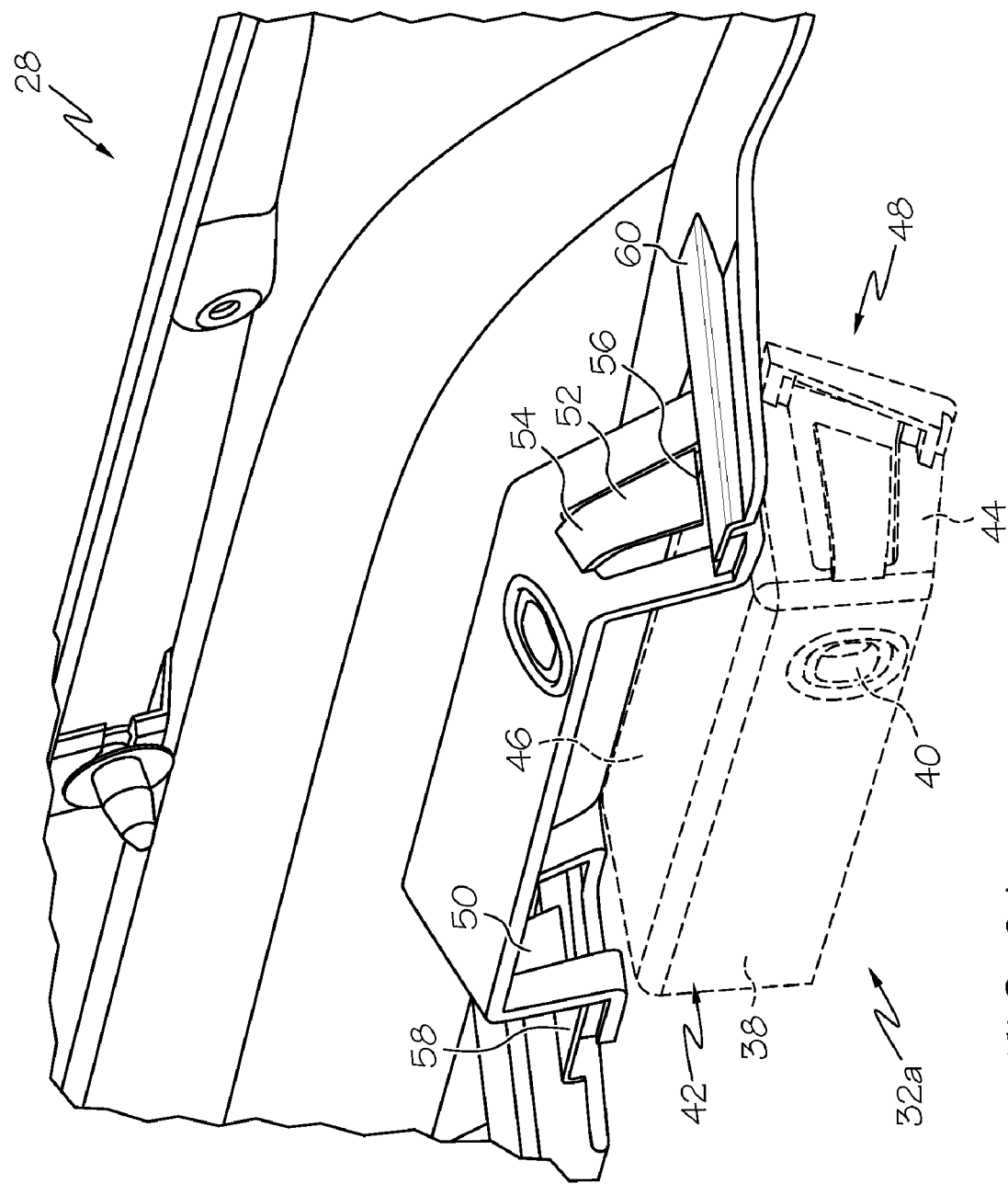
FIG. 2A is a detail view at area 2A of FIG. 2.

Referring to FIG. 2A, one or more of the lower connecting portions 32a-32e may include a connecting surface 38 including an opening 40 extending therethrough (e.g., for receiving a fastener), side surfaces 42 and 44 and a back surface 46. A locking feature 48 may be provided that can be used to lock the lower connecting portions 32 in their respective latched positions. The locking features 48 may include a catch member 50 and 52 that extends outwardly from the respective side surfaces 42 and 44 at a downward bend 54, downwardly to a free end 56. The free ends 56 may be offset outwardly from the side surfaces 42 and 44 so as to catch ledges 58 and 60 once the lower connecting portions 32 are placed in their latched positions. In some embodiments, the catch members 50 and 52 may be resilient such that they may be displaced toward the side surfaces 42 and 44 as the catch members 50 and 52 move past the catch ledges 58 and 60, springing back to their original configurations once the free ends 56 are above the catch ledges 58 and 60. While FIGS. 2 and 2A illustrate locking features 48, any other suitable locking features may be used, such as snaps, that are suitable for locking the lower connecting portions 32 in their latched positions. In other embodiments, one or more of the lower connecting members 32 may not be provided with a locking feature. In these embodiments, one or more of the lower connecting members 32 may be held in the latched position only once the lower connecting members 32 are connected to the vehicle body 16.

Figure 3:
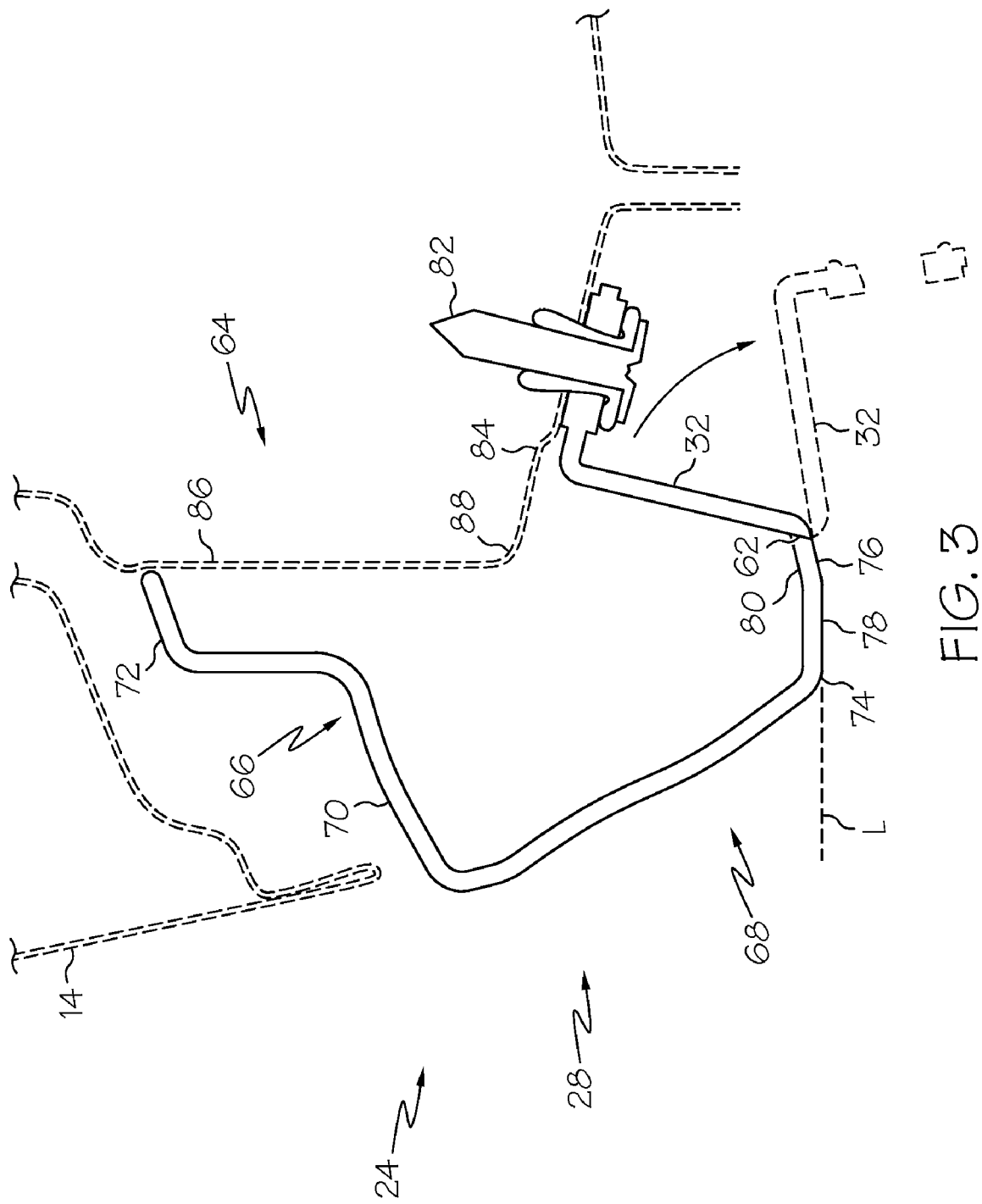
FIG. 3 is a section view of the rocker panel of FIG. 2 attached to a vehicle frame member according to one or more embodiments described herein.

Referring now to FIG. 3, as indicated above, the trim portion 28 is moveably connected to the lower connecting portion 32 by a region of weakness, such as a living hinge 62, that is integrally formed (e.g., via molding and/or machining) with the trim portion 28 and the lower connecting portion 32 such that the lower connecting portion 32 can rotate relative to the trim portion 28 between the latched position (indicated by the solid lines) and the unlatched position (indicated by the dashed lines). In some embodiments, the living hinge 62 is formed by a relatively thin region of material connecting the trim portion 28 and the lower connecting portion 32. In the embodiment of FIG. 3, the rocker panel 24 is illustrated as being attached to a frame member 64 of the vehicle 10 (shown in phantom).

As can be seen by FIG. 3, the trim portion 28 may include a generally outwardly extending portion 66 that extends outwardly in the vehicle widthwise direction and a generally inwardly extending portion 68 that extends inwardly toward a center of the vehicle 10. The outwardly extending portion 66 may include one or more steps (e.g., see steps 70 and 72) that may, for example, provide clearance for the door 12 and/or 14 (shown in phantom) while extending the outer surface 34 outwardly toward an outer surface of the door 12 and/or 14, e.g., to provide an aesthetically pleasing flush appearance with the door in its closed position.

The inwardly extending portion 68 may extend inward and downward toward the ground to a lower bend 74. The inwardly extending portion 68 may extend substantially horizontally at a horizontal section 78 to upward bend 76. The inwardly extending portion 68 may extend upwardly at the bend 76 at an upwardly extending section 80 (e.g., at an angle of about one degree or more to the horizontal, such as about two degrees or more to the horizontal, such as about three degrees or more to the horizontal, such as about five degrees or more to the horizontal, such as about eight degrees or more to the horizontal, such as about 10 degrees or more to the horizontal, such as about 15 degrees or more to the horizontal, such as about 20 degrees or more to the horizontal).

In other embodiments, the upwardly extending section 80 may extend upwardly from the lower bend 74. In still other embodiments, there may be a number of upward bends as the inwardly extending portion 68 extends inward and upward from the lower bend 74. In the illustration, dashed line L represents the lowest point (i.e., closest to the ground) of the trim portion 28. The upwardly extending section 80 of the inwardly extending portion 68 locates a lowermost point of the living hinge 62 a distance above L, for example, of about 0.5 mm or more, such as of about one mm or more, such as of about two mm or more, such as of about four mm or more, such as of about five mm or more, such as between about 0.5 mm and about 10 mm, such as about 1.3 mm or about 5 mm, with the lower connecting portion 32 in the latched position.

Figure 4B:
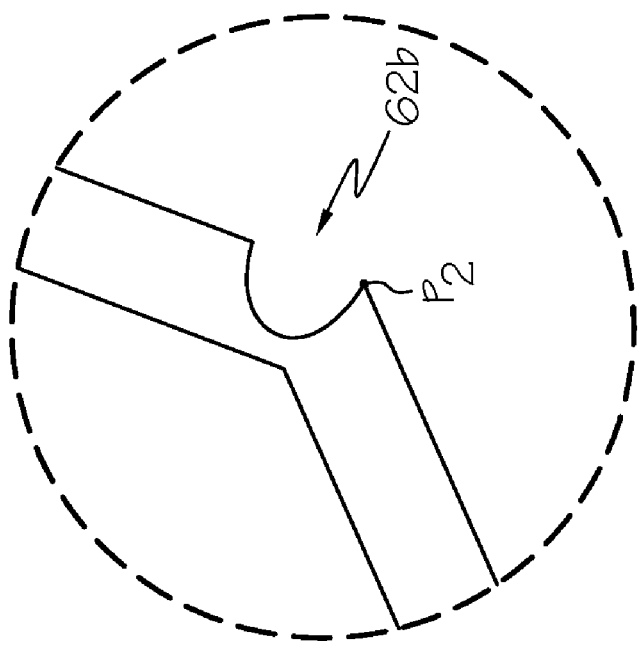
FIG. 4B illustrates another living hinge for use with the rocker panel of FIG. 2 according to one or more embodiments described herein.
Figure 4A:
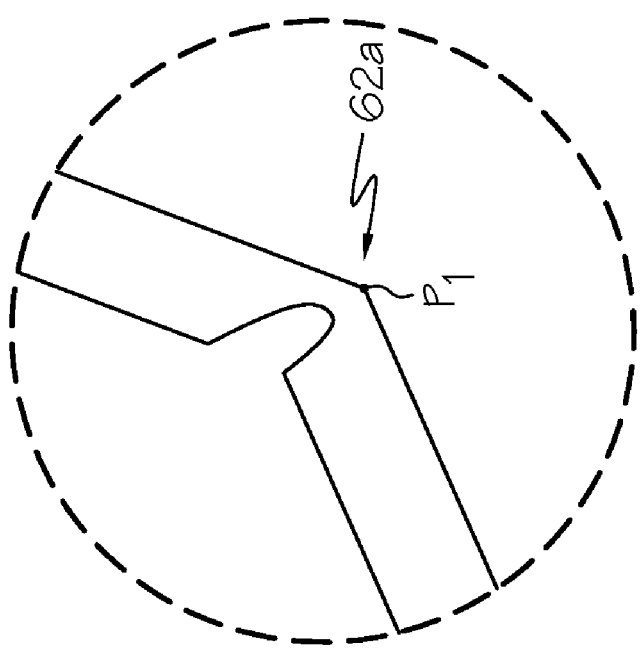
FIG. 4A illustrates a living hinge feature for use with the rocker panel of FIG. 2 according to one or more embodiments described herein.

FIGS. 4A and 4B illustrate two exemplary living hinge structures 62a and 62b, respectively, to illustrate the lowermost points $P_1$ and $P_2$ of the hinge structures. As used herein, the lowermost point of the living hinge (or other region of weakness) is the point forming part of the living hinge structure having the lowest elevation. For example, referring to FIG. 4A, $P_1$ represents the point forming part of the living hinge 62a of lowest elevation. Referring to FIG. 4B, $P_2$ represents the point forming part of the living hinge 62b of lowest elevation. As can be appreciated, the lowermost point of the living hinge (or other region of weakness) may depend on the particular structure of the living hinge (or other region of weakness).

Referring back to FIG. 3, the lower connecting portion 32 of the rocker panel 24 is illustrated in its unlatched position (shown by dotted lines) and its unlatched position (shown by solid lines). The rocker panel 24 may be connected to the frame member 64 using any suitable method such as using fasteners 37 in the upper connecting portion 30 (FIG. 2) and fasteners 82 (e.g., rivets) extending through openings 40 in the connecting surfaces 38. In the illustrated embodiment, the lower connecting portion 32 is connected to an inwardly extending portion 84 of the frame member 64 and the upper connecting portion 30 is connected to a vertically extending portion 86 of the frame member 64 that is connected to the inwardly extending portion 86 by a bend 88. In some embodiments, the upward bend 76 is located exterior (i.e., to the outside) of the inwardly extending portion 84 of the frame member 64. In another embodiment, the upward bend 76 may be located inward (i.e., to the inside) of the inwardly extending portion 86 of the frame member 64.

Referring now to FIG. 5, the rocker panel 24 is illustrated in operation. As the lowest point of the rocker panel 24 contacts the ground G (or other structure), the upwardly extending section 80 of the inwardly extending portion 68 of the rocker panel 24 locates the lowermost point of the living hinge 62 above the ground G. Locating such regions of weakness remote from the ground and above lowest portions of the rocker panel 24 can reduce the likelihood that the regions of weakness will come into contact with the road or other road structures. The above-described rocker panels having improved resistance to damage may be connected to the vehicle at the factory (by the manufacturer) or may be provided as an aftermarket part.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle side door structure comprising:
a door; and
a rocker panel providing a show surface beneath the door, the rocker panel comprising
a trim portion providing the show surface; and
a connecting portion moveably connected to the trim portion by a region of weakness such that the connecting portion is movable relative to the trim portion while connected thereto between an unlatched position and a latched position;
wherein the trim portion includes a lowest point spaced horizontally from the region of weakness and an upwardly extending section extending upwardly from the lowest point of the trim portion that locates a lowermost point of the region of weakness above the lowest point of the trim portion with the connecting portion in the latched position.

2. The vehicle side door structure of claim 1, wherein the region of weakness is a living hinge that allows the connecting portion to pivot relative to the trim portion between the unlatched position and the latched position.

3. The vehicle side door structure of claim 1 further comprising a locking structure configured to lock the connecting portion in the latched position.

4. The vehicle side door structure of claim 1, wherein the trim portion includes an outwardly extending portion and an inwardly extending portion, the inwardly extending portion extending inward and down from the outwardly extending portion to a lower bend.

5. The vehicle side door structure of claim 4, wherein the inwardly extending portion includes a horizontal section extending inwardly from the lower bend toward the upwardly extending section.

6. The vehicle side door structure of claim 5, wherein the trim portion is connected to a vertical portion of a frame member at an upper connecting portion and the connecting portion is a lower connecting portion that is connected to an inwardly extending portion of the frame member.

7. The vehicle side door structure of claim 6, wherein the upwardly extending section is connected to the horizontal section by another bend.

8. The vehicle side door structure of claim 7, wherein the another bend is located exterior of the inwardly extending portion of the frame member.

9. A rocker panel providing a show surface beneath a vehicle door, the rocker panel comprising:
a trim portion providing the show surface; and
a connecting portion moveably connected to the trim portion by a region of weakness such that the connecting portion is movable relative to the trim portion while connected thereto between an unlatched position and a latched position;
wherein the trim portion includes a lowest point and an upwardly extending section extending both horizontally and vertically that locates a lowermost point of the region of weakness about 0.5 mm or more above the lowest point of the trim portion with the connecting portion in the latched position.

10. The rocker panel of claim 9, wherein the upwardly extending section locates the lowermost point of the region of weakness about 1 mm or more above the lowest point of the trim portion with the connecting portion in the latched position.

11. The rocker panel of claim 9, wherein the upwardly extending section locates the lowermost point of the region of weakness about 5 mm or more above the lowest point of the trim portion with the connecting portion in the latched position.

12. The rocker panel of claim 9, wherein the upwardly extending section locates the lowermost point of the region of weakness between about 0.5 mm and about 10 mm above the lowest point of the trim portion with the connecting portion in the latched position.

13. The rocker panel of claim 9, wherein the upwardly extending section extends upwardly at an angle of about 2 degrees or more from the horizontal.

14. The rocker panel of claim 9, wherein the region of weakness is a living hinge.

15. A vehicle including a side door structure, comprising:
a door;
a frame member including an inwardly extending portion and a vertically extending portion; and
a rocker panel connected to the frame member for providing a show surface beneath the door, the rocker panel comprising
a trim portion connected to the vertically extending portion of the frame member; and
a connecting portion connected to the inwardly extending portion of the frame member, the connecting portion being moveably connected to the trim portion by a region of weakness such that the connecting portion is movable relative to the trim portion while connected thereto between an unlatched position and a latched position;
wherein the trim portion includes a lowest point and a bend between the lowest point and the connecting portion providing an upwardly extending section that locates a lowermost point of the region of weakness above the lowest point of the trim portion.

16. The vehicle of claim 15, wherein the bend is located at a horizontal position that is exterior of the inwardly extending portion of the frame member.

17. The vehicle of claim 15, wherein the lowermost point of the region of weakness is located about 0.5 mm or more above the lowest point of the trim portion.

18. The vehicle of claim 15, wherein the lowermost point of the region of weakness is located about 5 mm or more above the lowest point of the trim portion.

19. The vehicle of claim 15, wherein the lowermost point of the region of weakness between about 0.5 mm and about 10 mm above the lowest point of the trim portion.

20. The vehicle of claim 15, wherein the upwardly extending section extends upwardly at an angle of about 2 degrees or more from the horizontal.

* * * * *